(12) United States Patent
Wang et al.

(10) Patent No.: US 7,380,262 B2
(45) Date of Patent: May 27, 2008

(54) METHOD AND APPARATUS FOR GENERATING A LIST OF SUGGESTED SCHEDULED TELEVISION PROGRAMS

(75) Inventors: Chunzhi Wang, Indianapolis, IN (US); Darrel Wayne Randall, Danville, IN (US); Michael Joseph McLane, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 1566 days.

(21) Appl. No.: 09/879,288

(22) Filed: Jun. 12, 2001

(65) Prior Publication Data

US 2002/0188949 A1    Dec. 12, 2002

(51) Int. Cl.
*G06F 3/00* (2006.01)
*G06F 13/00* (2006.01)
*H04N 5/445* (2006.01)

(52) U.S. Cl. .......................... 725/46; 725/39; 725/45; 725/50

(58) Field of Classification Search ................. 725/34, 725/35, 46, 45, 50
See application file for complete search history.

(56) References Cited

U.S. PATENT DOCUMENTS

| | | | |
|---|---|---|---|
| 5,223,924 A | | 6/1993 | Strubbe |
| 5,410,344 A | | 4/1995 | Graves et al. |
| 5,594,509 A | * | 1/1997 | Florin et al. ................. 725/43 |
| 5,629,733 A | | 5/1997 | Youman et al. |
| 5,694,176 A | | 12/1997 | Bruette et al. |
| 5,734,444 A | | 3/1998 | Yoshinobu |
| 5,758,257 A | | 5/1998 | Herz et al. |
| 5,758,259 A | * | 5/1998 | Lawler ......................... 725/45 |
| 5,798,785 A | | 8/1998 | Hendricks et al. |

(Continued)

FOREIGN PATENT DOCUMENTS

EP    0 878 964 A1    11/1998

(Continued)

OTHER PUBLICATIONS

Motorola, Inc. "BiStatix TM Technology—A White Paper, Vers. on 4.1, www.motorola.com/smartcard/4_6_whitepaper.htm", published on the Internet on or before Jun. 12, 2001.

*Primary Examiner*—Chris Kelley
*Assistant Examiner*—Farzana E Hossain
(74) *Attorney, Agent, or Firm*—Joseph J. Laks; Harvey Fried; Joel M. Fogelson

(57) ABSTRACT

A system and method for generating a list of suggested scheduled television programs wherein television schedule guide data which comprises characteristics of scheduled programs and optionally relevancy of those characteristics is obtained from broadcast information. User profiles comprising characteristics of television programs previously viewed, the cumulative amount of time programs having those characteristics has been previously viewed, and optionally the relevancy of the previously viewed characteristics is stored. The user is allowed to manually adjust the weights assigned to characteristics so as to override the system assigned weight values. The system calculates the suggested program list from the schedules it receives from broadcast or other means, using the characteristic weights in the user profiles. The user interface displays percentage values currently assigned to characteristics in that user's profile, but smoothes the percentage values by calculating them based on a ratio of characteristic weights to the greater of a preset value such as 500 or the actual weight of the highest weighted characteristic in that user's profile.

17 Claims, 6 Drawing Sheets

U.S. PATENT DOCUMENTS

| | | |
|---|---|---|
| 5,801,747 A | 9/1998 | Bedard |
| 5,822,123 A | 10/1998 | Davis et al. |
| 5,867,226 A | 2/1999 | Wehmeyer et al. |
| 5,945,988 A | 8/1999 | Williams et al. |
| 5,977,964 A | 11/1999 | Williams et al. |
| 6,005,565 A * | 12/1999 | Legall et al. ............... 715/721 |
| 6,005,597 A | 12/1999 | Barrett et al. |
| 6,020,883 A | 2/2000 | Herz et al. |
| 6,023,267 A | 2/2000 | Chapuis et al. |
| 6,088,722 A | 7/2000 | Herz et al. |
| 6,133,909 A | 10/2000 | Schein et al. |
| 6,163,316 A | 12/2000 | Killian |
| 6,169,543 B1 | 1/2001 | Wehmeyer |
| 6,182,287 B1 | 1/2001 | Schneidewend et al. |
| 6,236,395 B1 | 5/2001 | Sezan et al. |
| 6,243,142 B1 | 6/2001 | Mugura et al. |
| 7,131,134 B2 * | 10/2006 | Trovato et al. ............... 725/46 |
| 2002/0095676 A1 * | 7/2002 | Knee et al. .................. 725/46 |
| 2002/0100046 A1 * | 7/2002 | Dudkiewicz ................. 725/46 |
| 2002/0118954 A1 * | 8/2002 | Barton et al. ................. 386/83 |
| 2002/0188947 A1 * | 12/2002 | Wang et al. .................. 725/45 |
| 2003/0118323 A1 * | 6/2003 | Ismail et al. .................. 386/83 |
| 2005/0278741 A1 | 12/2005 | Robarts et al. |

FOREIGN PATENT DOCUMENTS

| | | |
|---|---|---|
| JP | 10162027 | 6/1998 |
| JP | 2000059745 | 2/2000 |
| JP | 200253325 | 9/2000 |
| WO | WO 99/01984 | 1/1999 |
| WO | 99/35830 | 7/1999 |
| WO | 00/04708 | 1/2000 |
| WO | WO 00/04708 | 1/2000 |
| WO | 01/15449 | 3/2001 |
| WO | 02/25938 | 3/2002 |

* cited by examiner

| Press Plus Or Minus Button To Increase Or Decrease Weighting | | | |
|---|---|---|---|
| All Movies | 100% | - | + |
| Comedy | 100% | - | + |
| Drama | 0% | - | + |
| Horror | 0% | - | + |
| Romance | 0% | - | + |
| Music | 50% | - | + |
| Fantasy | 0% | - | + |
| Western | 0% | - | + |

Reset All Topics
Edit Movies
Edit Sports
Edit News
Edit Lifestyles
Edit Themes

*FIG. 1*

METHOD AND APPARATUS FOR GENERATING A LIST OF SUGGESTED SCHEDULED TELEVISION PROGRAMS

FIELD OF THE INVENTION

The subject invention concerns apparatus for suggesting scheduled television programs for watching or recording based on individual viewer preferences.

BACKGROUND OF THE INVENTION

Methods and apparatus for generating lists of scheduled programs for watching based on user preferences have previously been suggested by Wehmeyer, et al., U.S. Pat. No. 5,867,226, which disclosed a television system in which at least program title information for programs which are to be transmitted in the future is transmitted in advance to form a channel guide listing, apparatus is provided for searching for specific television programs which satisfy certain criteria concerning a user's viewing preferences, and upon successful conclusion to the search, the apparatus generates a list of such television programs in order to predict for the viewer certain programs which may be of interest. According to Wehmeyer, et al., a list of predictions of television programs which the viewer might find interesting can be generated from program guide data corresponding to future programs which is broadcast combined with data corresponding to programs previously watched using the apparatus. According to Wehmeyer, et al., whenever a program is watched for a given period of time, for example, 5 minutes or more, the system keeps a record and thereby the viewing habits and preferences can be determined, which allows the system to predict which upcoming programs should be of interest to the users of the apparatus.

The Wehmeyer, et al. apparatus stores information about the particular television shows which the user watches and uses that information as search criteria. Although the search criteria is editable by the viewer to further refine the searches, only limited amount user editable capability is provided.

In addition, present inventors recognized the drawback with some prior methods and apparatus which assume previous viewing of a program with a particular characteristic for even a few minutes should be considered in the selection criteria.

Because of the limitations of the prior systems and methods as described abvoe, suggested programs were often listed which were not very consistent with the viewer's actual preferences and tendencies.

SUMMARY OF THE INVENTION

It is an object of the present invention to overcome the problems with the prior methods and systems and to provide improved ones. These objects and others which will become apparent from the following disclosure are achieved by the present invention which comprises in one aspect a method of generating a list of suggested scheduled television programs comprising obtaining television schedule guide data which comprises characteristics of scheduled programs, collecting and processing data on characteristics of televisions programs previously viewed and the amount of time previously viewed, automatically assigning weights to said characteristics based on the total time programs having said characteristics were previously viewed, allowing a user to manually adjust the weights assigned to characteristics, and using the optionally adjusted characteristic weights to generate the suggested list of scheduled television programs. The assigned weights may be periodically updated.

Another aspect of the present invention comprises a television system for displaying suggested scheduled programs comprising memory for temporarily storing data representing a television program guide schedule list which includes characteristics data for scheduled television programs, memory for storing weights assigned by the system to characteristics of television programs previously viewed based on the total time programs having those characteristics was viewed by a user, a user interface for allowing a user to override the weights assigned by the system and cause the system to assign revised characteristic weights and a processor which calculates a suggested list of programs having user preferred characteristics ranked according to the revised characteristics weights.

BRIEF DESCRIPTION OF THE DRAWINGS

FIG. 1 is an illustration of a screen display of a characteristic weighting display embodiment, in accordance with an aspect of the invention.

DETAILED DESCRIPTION OF THE INVENTION

Figure 2:
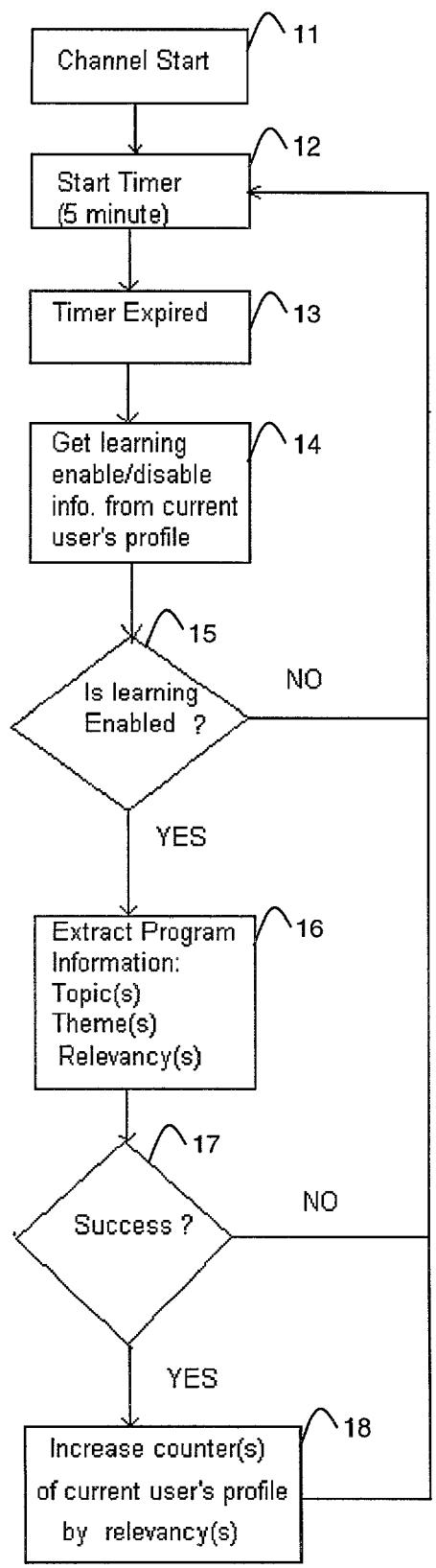
FIG. 2 is a flowchart useful in understanding the invention.

The preferred system can calculate percentages based on the calculated weights for each characteristic, display the percentages, and allow the user to manually adjust or override the system assigned weights by adjusting the percentages using the display. The preferred system updates the weights periodically, for example every five minutes, and calculates the percentages based on those weights when the user requests a display of the preferences at the user interface. The user adjustments to percentages cause corresponding changes in the weights stored in memory, resulting in the revised characteristic weights.

In the preferred system, most television programs have a topic and a theme and a relevancy, for example from 1 to 10, that, for example, may be assigned by a broadcaster.

For each topic-theme combination, a weight can be calculated based on the sum of the number of 5 minute periods time the relevancy. For example, if the user watches a program having topic(1) and theme(2) and broadcaster assigned relevancy of 7 for a period of 30 minutes, a time value of 6 (i.e., 30 minutes/5 min. interval) times relevancy of 7 results in a weight of 42 for topic-theme (1)(2). In a system having 10 topics and 10 themes, each topic-theme, (1)(1); (1)(2); . . . ; (10)(10), would have an independently calculated weighting for each user. A preferred system can have up to 5 users, and each user must log in for his viewing preferences to be learned and used in calculating the suggested list.

In the preferred embodiments, the percentages displayed for the user to review and optionally adjust are calculated in a special way so as to avoid the prior art aberration wherein a program viewed for only 5 minutes would cause the percentage to increase to 100 where only one program had been viewed because the prior art used the weighting as the numerator and the highest weighting for any characteristic as the denominator. The present method and system uses the higher of the actual highest weighting number in memory or 500, resulting in the need to watch a program having a particular topic-theme combination for at least 50 five minute periods if relevancy is always 10, or at least 500 five minute periods if relevancy is always 1, before the 100 percent number will be displayed for the user so as to cause a gradual increase in percentage weightings assigned to a particular characteristic, rather than the abrupt increases encountered with prior systems. The percentage value increases as the absolute value increases, and manual changes to the percentages automatically change the absolute values in the counters. In the illustrated embodiment, the percentages are rounded off to the closest 10 percent, i.e., 10, 20, 30, . . . 100 percent can be displayed in the user interface.

The display can be a conventional television screen and text and/or graphics comprising topic or theme preference weighting adjustment icons would be displayed.

In some embodiments, the characteristics would include not only topic-theme combinations, but title, date, and any other information which is provided in the schedule guide. As schedule guide technology becomes more sophisticated, more and more types of information may be provided by the schedule provider or other source of data. The characters and actors, specifics as to the theme of the broadcast, and other characteristics are now provided by broadcast systems such as Direct TV and the like, and more detailed information may be provided in the future. This system and method can be used to develop preference weightings for any characteristics for which data can be obtained from a broadcast, an online or broadcast schedule, or any other data source.

The controller can be any apparatus or software which is known for that purpose, and will typically comprise factory programmed firmware which operates the system and implements the method.

The list of suggested scheduled programs can include selectable options to record a listed program, to add a listed program to a "plan to view" list, and/or to display, i.e., tune to, a listed program at the time it is broadcast.

FIG. 1 shows a screen display produced, for example, by an RCA® DSS® direct broadcast satellite receiver system, manufactured by Thomson Consumer Electronics, Inc. Indianapolis, Ind., wherein icons represent plus and minus, and numerical text corresponding to characteristic weightings is adjustable by clicking on the plus and minus icons. In the drawing, the user has selected Edit Movies as the topic, and the percentages assigned to the topic All Movies is 100%, and the percentage assigned to themes Comedy, Drama, Horror, Romance, Music, Fantasy, and Western are 100, 0, 0, 0, 50, 0, and 0, respectively. The drawings illustrates that the user has selected the + icon for Music, and is in the process of overriding the calculated weighting which on a relative basis is 50% of the higher of 500 or the highest weighting of any characteristics in the memory for this user.

FIG. 2 shows a routine by which weightings are assigned based on 5 minute time periods, topic and theme as the characteristics, and relevancies of characteristics, wherein when a channel is first tuned 11 and watched by an identified user who has a profile, a timer is started 12, set at 5 minutes, and upon expiration 13 of 5 minutes, learning enable/disable selection from the current user's profile is obtained 14. If "enable is selected according to the user's profile 15, then topic, theme and relevancy data is extracted from the program data included in the broadcast 16, a success check is made 17, and then the current user's counter for each topic-theme characteristics in the program is increased 18 by the relevancy score for that topic-theme characteristic in that program, i.e., one 5 minute interval times the relevancy.

Figure 3:
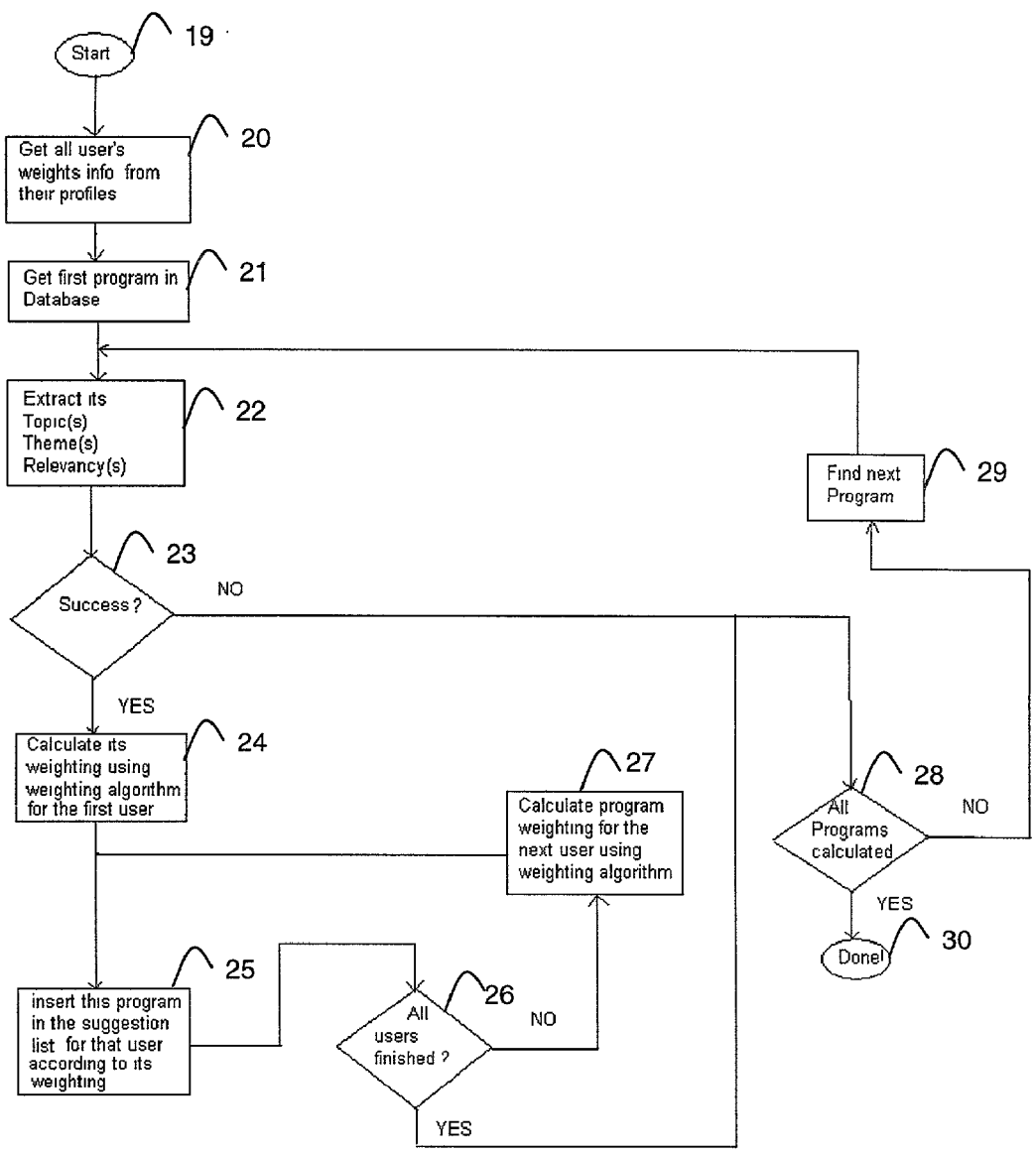
FIG. 3 is a flowchart showing the learning process of the invention.

FIG. 3 shows a routine of calculating the suggested scheduled program list which starts 19 with getting the user's weights information from their profile, getting a first program in the database 21 (received from DirecTV, for example), extracting 22 that program's topic, theme, and relevancy data from the data included with the program schedule received from the broadcaster or guide distributor, checking if successful 23, then if so calculating 24 the weighting using the weighting algorithm, and then inserting the program into the suggested program list according to its weighting 25, determining if there are additional users in the profile system 26, calculating the program weightings for the next user using the weighting algorithm 27, and repeating this routine until all of the programs in the program guide schedule have been calculated by performing an "all programs calculated?" test 28, if not all programs have been calculated, then finding the next program 29 until all the programs have been calculated, wherein the routine is done 30. The suggestion list only keeps a preset number of programs, e.g., 40, with the highest weightings.

Figure 4:
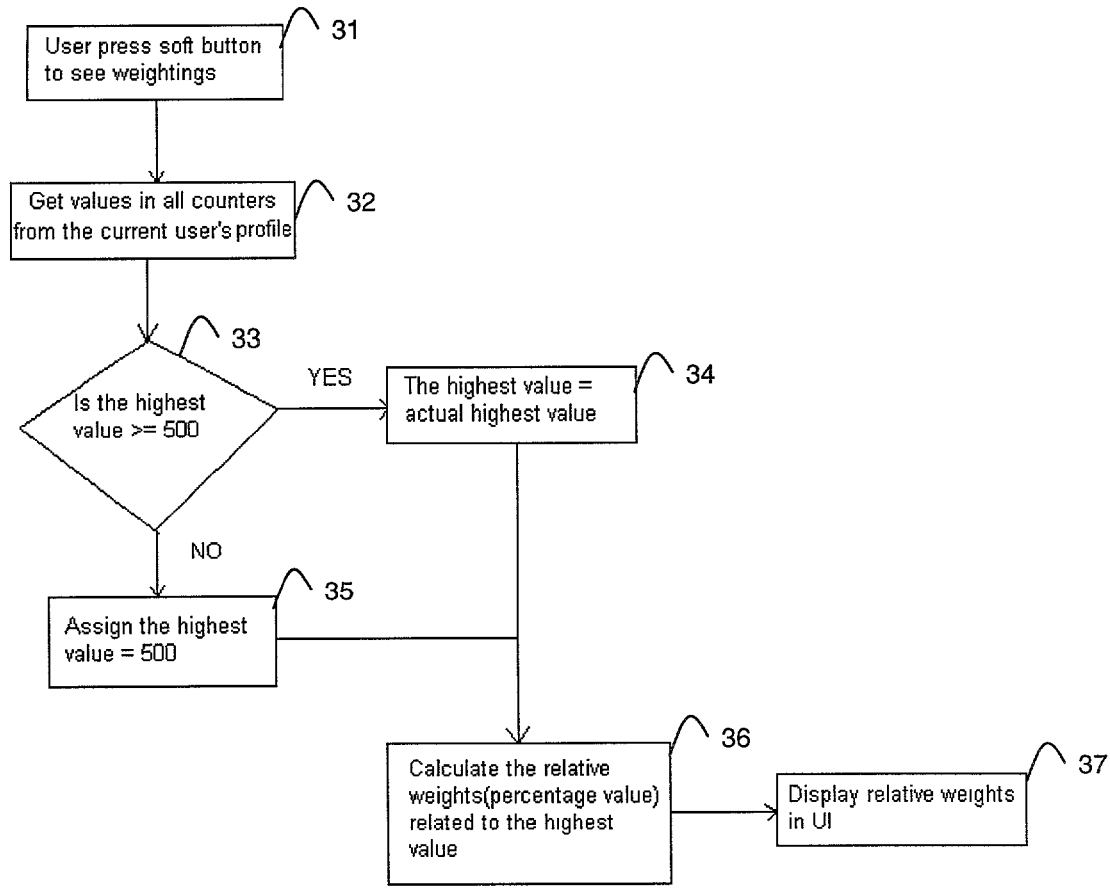
FIG. 4 is a flowchart showing the method for calculating and displaying percentage values.

FIG. 4 shows a method wherein the user may press 31 a soft button, i.e., a virtual, screen displayed button icon, as shown in FIG. 1 which illusrated "Edit Movies" to see the weightings stored in system memory (also illustrated in FIG. 1), wherein the system then gets the values in all counters from the current user's profile 32, tests 33 whether the highest value is at least 500, and, if not, assigns 500 as the highest value 35 or, if yes, uses the actual highest value 34, then calculates 36 the relative weights in terms of percentage value related to the "highest value." Then the system displays 37 the relative weights in the user interface.

Figure 5:
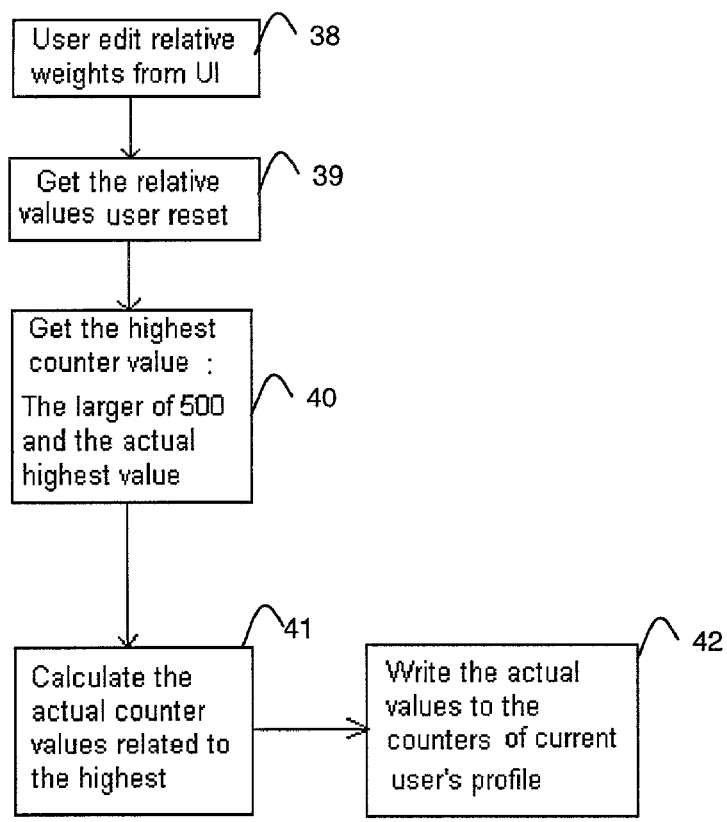
FIG. 5 is a flowchart showing a user edit process.

FIG. 5 shows an embodiment where the user uses the on screen soft buttons (FIG. 1) to edit relative weights in term of percentages 38 from the user interface, getting 39 the relative values in terms of percentages as reset by the user, getting 40 the "highest value," i.e., the larger of 500 and the actual highest value assigned to any topic-theme, calculating 41 the actual counter value related to the highest value, writing 42 the edited actual values to the counters of the current user's profile. The system calculates and displays the revised actual values in percentage format at the user interface.

Relevancy of a Topic-Theme is currently included in the data provided by the distributor of the program guide, and is usually between 1 and 10, with 10 being the most relevant.

For each user, the system reserves 16×16 counters to store program characteristics that viewer has watched. The exemplified system accommodates five unique users. There are counters for up to 16 topic numbers and under each topic there are up to 16 theme numbers in this embodiment. For example, topic # 1 can be Movie, and the system accommodates up to 16 movie themes such as Action, Horror, Romance, and/or others. The topic numbers are assigned by the DirecTV broadcast system, which also assigns a relevancy number from 1 to 10 for each topic and theme for each program in the DirecTV schedule or broadcast. The topic/theme numbers and the meaning for each Topic. Theme stay consistent, otherwise the profile data in the system becomes useless. To date there are less than 16 topics assigned by broadcasters.

To illustrate the writing of data to the counters, after a channel has been tuned for 5 minutes to a program entitled "Gone With the Wind," the topic "Movie (1)," theme "Drama (2)," and relevancy 10 values are obtained from the broadcast data associated with this "Gone With the Wind" program, which increments the 1×2 cell by 10, and after each five minute period that 1×2 cell value is incremented by [number of 5 minute periods]×[relevancy], or 10 in this example.

The counters store [number of 5 minute periods]×[relevancy] product for each topic/theme combination at a topic/theme cell for a unique user. Then a relative weight value is calculated and displayed in the user interface screen in terms of percentages.

The relative weight is generated by the system for display on the user interface manual adjustment screen so the user can view the relative weight in terms of a percentage, in 10 percent increments from 0 to 100, and can edit these percentages manually, in which case the actual counter values are be calculated according to the percentage value the user reset and will be written to the counter which is stored in EEPROM memory.

The system algorithm is programmed to display to the user the relative weight in terms of percentages, as mentioned, instead of the actual value in the counters because the actual value would not make sense the user.

Figure 6:
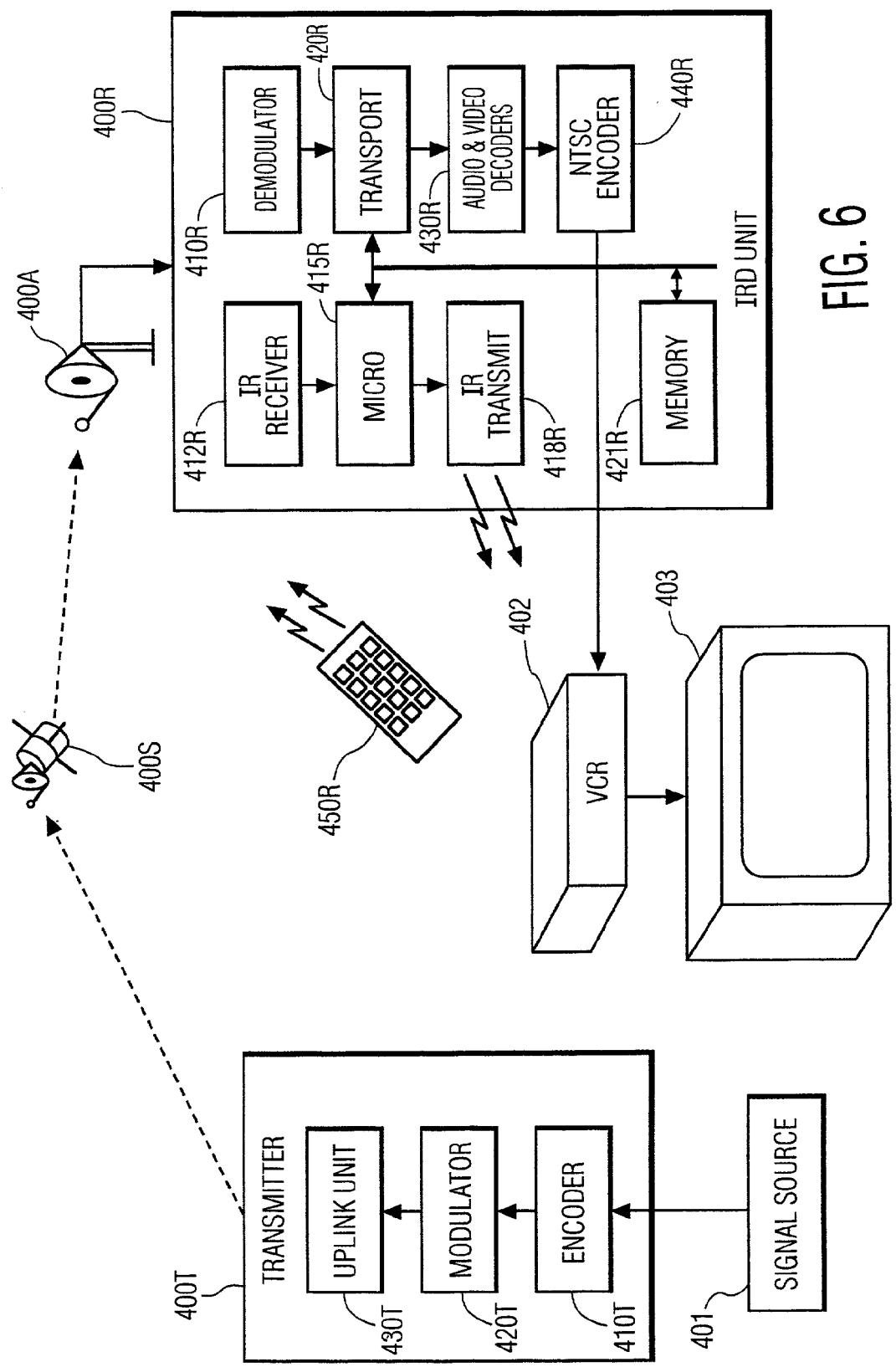
FIG. 6 is an illustration in block diagram form of apparatus suitable for use with the invention.

A brief description of system hardware, suitable for implementing the above-described invention, now follows. In FIG. 6, a transmitter 400T processes a data signal from a source 401 (e.g., a television signal source) and transmits it to a satellite 400S which receives and rebroadcasts the signal to a receiving antenna 400A which applies the signal to a receiver 400R. Transmitter 400T includes an encoder 410T, a modulator (i.e., modulator/forward error corrector (FEC)) 420T, and an uplink unit 430T. Encoder 410T compresses and encodes signals from source 401 according to a predetermined standard such as MPEG. MPEG is an international standard developed by the Moving Picture Expert Group of the International Standards Organization for coded representation of moving pictures and associated audio stored on digital storage medium. An encoded signal from unit 410T is supplied to modulator/Forward Error Corrector (FEC) 420T, which encodes the signal with error correction data, and Quaternary Phase Shift Key (QPSK) modulates the encoded signal onto a carrier.

Uplink unit 430T transmits the compressed and encoded signal to satellite 400S, which broadcasts the signal to a selected geographic reception area. The signal from satellite 400S is received by an antenna dish 400A coupled to an input of a so-called set-top receiver 400R (i.e., an interface device situated atop a television receiver). Receiver 400R includes a demodulator (demodulator/Forward Error Correction (FEC) decoder) 410R to demodulate the signal and to decode the error correction data, an IR receiver 412 for receiving IR remote control commands, a microprocessor 415R, which operates interactively with demodulator/FEC unit 41 OR, and a transport unit 420R to transport the signal to an appropriate decoder 430R within unit 400R depending on the content of the signal, i.e., audio or video information. An NTSC Encoder 440R encodes the decoded signal to a format suitable for use by signal processing circuits in a standard NTSC consumer VCR 402 and standard NTSC consumer television receiver 403. Microprocessor (or microcontroller, or microcomputer) 415R receives infrared (IR) control signals from remote control unit 450R, and sends control information to VCR 402 via an IR link 418R. Microprocessor 415R also generates the on-screen display (OSD) signals needed for presenting the interactive sentence, or confirmation sentence, to the user. Microprocessor 415R also receives and interprets cursor key X and Y information in order to control the highlighting of user choices in the on-screen displays.

Furthermore, the preferred embodiment changes the displayed percentage gradually because of the use of the higher of 500 or actual highest characteristics weight, as discussed above, and thereby shows the user the machine learning process, rather than as in prior systems where only a very small period of viewing time resulted in very abrupt percentage changes in the preferences display screen.

Although the invention was described with reference to a satellite television system, it is equally applicable to ground based television broadcast systems, both digital and analog or other video processing device having access to a program guide or the like.

What is claimed is:

1. A television system for displaying suggested scheduled programs comprising:
    memory means for storing data representing a user profile comprising characteristics and characteristic weights of programs viewed by said user;
    control means for automatically assigning characteristic weights in said user profile based on a time logged for each program being viewed by said user, ranking scheduled programs based on characteristics of each scheduled program and relative characteristic weights in said user profile, generating a list of suggested scheduled programs according to said ranking, calculating characteristic percentages based on relative characteristic weights in said user profile and generating a display of said characteristic percentages which can be manually adjusted by a user using a user interface;
    a user interface at which a user can view and manually adjust said characteristic percentages, thereby overriding said automatically assigned characteristic weights wherein said characteristic percentage is calculated based on the ratio of each characteristic weight to the greater of a preset value or a highest actual characteristic weight in said user profile.

2. The apparatus of claim 1 wherein said control means increments a characteristic weight for each elapsed 5 minute period for which a user watches a program having that characteristic.

3. The apparatus of claim 1 wherein said user interface presents weighting adjustment icons that comprise plus and minus buttons and a number representing the currently set percentage for a particular characteristic.

4. The apparatus of claim 1 wherein said control means generates a display of television programs comprising a list of television programs having similar characteristics to characteristics of a previously watched television program, wherein said list is generated based on weightings which are optionally user-assigned.

5. The apparatus of claim 1 wherein said list of suggested scheduled programs includes selectable options to record a listed program, to add a listed program to a plan to view list, and/or to display a listed program at the time it is broadcast.

6. A television system for displaying suggested scheduled programs comprising:
    memory means for storing data representing a user profile comprising characteristics and characteristic weights of programs viewed by said user;
    control means for automatically assigning characteristic weights in said user profile based on a time logged for each program being viewed by said user, ranking scheduled programs based on characteristics of each scheduled program and relative characteristic weights in said user profile, generating a list of suggested scheduled programs according to said ranking, calculating characteristic percentages based on relative characteristic weights in said user profile and generating a display of said characteristic percentages which can be manually adjusted by a user using a user interface;

a user interface at which a user can view and manually adjust said characteristic percentages, thereby overriding said automatically assigned characteristic weights wherein in response to user-entered data, said control means controls said display means to display said list of characteristics, said list of characteristics including a percentage number which is calculated based on a value that is selected from the greater of a preset minimum value and an actual counter value, said actual counter value being the sum of the product of the number of 5 minute periods any program having a topic-theme combination is viewed times the relevancy factor assigned by the broadcaster.

7. The apparatus of claim 1 further including means to identify one of a plurality of users, wherein said memory means is adapted to store user program guide characteristic search preferences data for said plurality of users, and wherein said list of suggested scheduled programs is generated based on preferences data for one identified user.

8. A method of generating a list of suggested scheduled television programs comprising the steps of:
maintaining a user profile comprising characteristics of programs previously viewed by said user and characteristic weights calculated from the cumulative amount of time said user has viewed programs having each of said characteristics,
using television schedule guide data which comprises characteristics of scheduled programs and relevancy factors to calculate a list of suggested scheduled programs, and
allowing a user to manually adjust said assigned weightings wherein characteristic percentages are calculated from said characteristic weights according to a ratio of each characteristic weight to the greater of a preset minimum value and the actual highest characteristic value in that user's profile.

9. The method of claim 8 wherein a characteristic weighing in a user profile is incremented by said relevancy factor upon elapse of each 5 minute period during which the user is tuned to program having said characteristic and said relevancy factor.

10. The method of claim 8 wherein said characteristics consist of topic and theme.

11. The method of claim 8 wherein weights to be assigned to characteristics are adjusted manually by use of displayed icons and scrollable percentage numbers.

12. The method of claim 8 wherein said topics and themes are obtained from broadcast data and are selected from the group consisting of: movies, sports, mystery, science fiction, history, baseball, golf, comedy, basketball, religion, talk, documentary, and shopping.

13. The method of claim 8 wherein data is collected for a plurality of users in a user profile record and each user is allowed to manually adjust weights to be assigned to characteristics in that user's profile record.

14. The method of claim 8 wherein said weights assigned to said characteristics are increased by a relevancy factor at the completion of each five minute interval of viewing of a program having that characteristic by a user.

15. A method of generating a list of suggested scheduled television programs comprising the steps of:
maintaining a user profile comprising characteristics of programs previously viewed by said user and characteristic weights calculated from the cumulative amount of time said user has viewed programs having each of said characteristics,
using television schedule guide data which comprises characteristics of scheduled programs and relevancy factors to calculate a list of suggested scheduled programs, and
allowing a user to manually adjust said assigned weightings wherein said characteristics consist of topic-theme combinations, said weights are calculated for each characteristic as a product of a total number of five minute intervals a program having each characteristic is watched by said user times a relevancy factor on a scale of 1 to 10, and said weights are incremented each time said viewer watches an additional program wherein characteristic percentages are calculated from said characteristic weights according to a ratio of each characteristic weight to the greater of a preset minimum value and the actual highest characteristic value in that user's profile, wherein said user may manually adjust weights to be assigned to characteristics by use of displayed icons and scrollable percentage numbers.

16. The method of claim 15 wherein said weights assigned to each characteristic in said user profile are increased by said relevancy factor at the completion of each said five minute interval of viewing of said program having each said characteristic by said user.

17. The apparatus of claim 1 wherein said user interface displays at least two topics in a menu;
when a topic is selected from said at least two topics, said user interface displays at least two themes;
said user interface is provides an interface to adjust said characteristic percentages percentage weights corresponding to said at least two themes; and
said at least two topics and said at least two themes are not information categories that are television programs.

* * * * *